United States Patent [19]

Peschmann et al.

[11] 4,057,728

[45] Nov. 8, 1977

[54] X-RAY EXPOSURE DEVICE COMPRISING A GAS-FILLED CHAMBER

[75] Inventors: Kristian Peschmann; Hans-Georg Junginger, both of Aachen; Hans-Jürgen Hirsch, Tuddern, all of Germany

[73] Assignee: U.S. Philips Corporation, New York, N.Y.

[21] Appl. No.: 655,754

[22] Filed: Feb. 6, 1976

[30] Foreign Application Priority Data

Feb. 7, 1975 Germany ............................ 2505173

[51] Int. Cl.[2] .............................................. G01T 1/18

[52] U.S. Cl. ..................................... 250/374; 250/385

[58] Field of Search ........................ 250/374, 375, 385

[56] References Cited

U.S. PATENT DOCUMENTS

| | | | |
|---|---|---|---|
| 3,808,441 | 4/1974 | Boux | 250/385 X |
| 3,852,610 | 12/1974 | McIntyre | 250/385 |
| 3,942,012 | 3/1976 | Boux | 250/385 |

*Primary Examiner*—Davis L. Willis

*Attorney, Agent, or Firm*—Frank R. Trifari; Carl P. Steinhauser

[57] ABSTRACT

An x-ray exposure device comprising a flat and plane rectangular chamber containing an ionizable gas and having walls provided with electrode structures which generate a potential distribution corresponding to that of two concentric spherical electrodes, an insulating foil on which charge carriers resulting from ionization of the gas by the x-radiation and displaceable in the longitudinal direction of the chamber being arranged therewithin.

4 Claims, 1 Drawing Figure

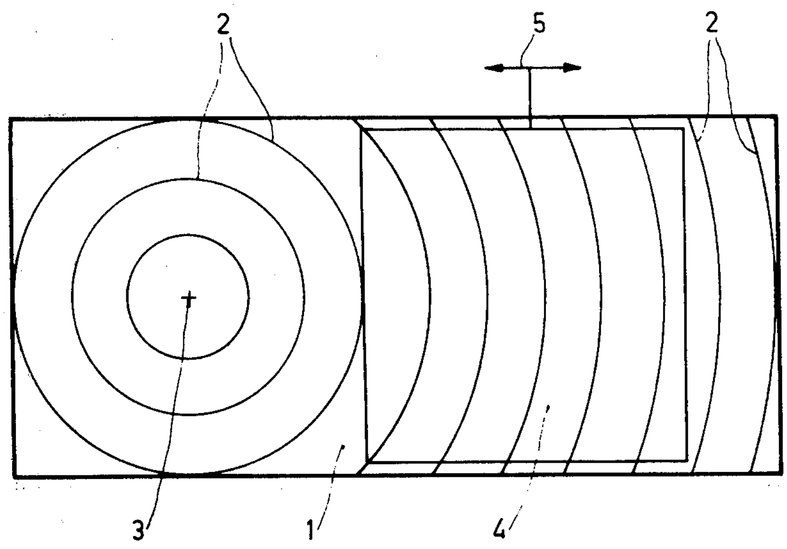
2
5
2
3
1
4

X-RAY EXPOSURE DEVICE COMPRISING A GAS-FILLED CHAMBER

The invention relates to an X-ray exposure device, comprising a flat and plane chamber having walls provided with electrode structures which generate a potential distribution corresponding to that of two concentric spherical electrodes during operation, and also comprising an insulating foil which is arranged in the chamber and on which charge carriers resulting from ionization of the gas by X-radiation are incident.

An X-ray exposure device comprising a gas-filled flat and plane chamber having arranged in it an insulating foil on which the charge carriers are incident which result from ionization of the gas by X-radiation is described, for example, in U.S. Pat. No. 3,774,029. Therein, an upper as well as a lower chamber wall comprises electrodes between which a homogeneous field is generated by the application of a voltage. This electrical field accelerates the charge carriers resulting from ionization by the X-radiation and ensures that either the positive or the negative charge carriers are incident on the insulating foil, depending on which one of the two electrodes the insulating foil is arranged in front of. The charge distribution on the foil, which is dependent on the intensity of the local X-radiation dose in the chamber, can subsequently be made visible by means of one of the known electrostatic development methods.

A chamber of this kind has a drawback in that the resolution at the edges of the image is poorer than at the center. This is due to the fact that at the edges of the chamber the X-rays enter obliquely with respect to the chamber walls, while the electrons or ions generated by the X-rays travel along the lines of the electrical field perpendicular to the chamber walls. The position at which a radiation quantum entering near the outer edge of such a chamber is imaged on the insulating foil arranged in the chamber is, therefore, dependent on the height in the chamber at which the ionization occurs. Because the chamber walls are spaced comparatively far apart (approximately 10 mm), a lack of definition occurs which becomes greater as the distance between the electrodes is increased, as the insulating foil is increased in size, and as the distance between the chamber and the X-ray source is reduced.

In order to avoid this lack of definition at the edge, it is known (for example, from U.S. Pat. No. 3,859,529) to provide the chamber walls with electrode structures which generate a potential distribution which corresponds to the potential distribution between two concentric spherical electrodes. This potential distribution can be obtained, for example, by means of annular electrodes which carry a different potential and which are arranged in the upper and the lower chamber wall. When the X-ray source is situated at a given distance from the chamber and the central beam is directed perpendicularly to the center of the chamber, the described lack of definition at the edge can indeed be avoided. These chambers, however, do not offer a satisfactory solution for exposures where the X-radiation enters obliquely.

The invention has for its object to provide an improved X-ray exposure device. To this end, an X-ray exposure device of the kind set forth according to the invention is characterized in that the chamber is rectangular in form, the insulating foil being displaceable in the longitudinal direction of the chamber.

An embodiment of the invention will now be specifically described by way of example, with reference to the drawing, the single FIGURE of which shows in plan view a chamber suitable for use in an exposure device embodying the invention.

Referring to the drawing, a chamber 1 comprises two parallel walls, only one of which is visible in the drawing. The distance between the walls of the chamber being approximately 10 mm and forming a space which is hermetically sealed and filled with a heavy-atom rare gas, preferably xenon, under a pressure of a few atmospheres. For further details of the chamber, reference is made to U.S. Pat. No. 3,774,029. The chamber 1 has a rectangular shape, the width being chosen so that the widest insulating foil used for forming an image, can be arranged therein, the longer dimension of the chamber, which defines the longitudinal direction, being substantially greater than the dimension of the insulating foil measured along the same direction.

The chamber walls are provided with an electrode structure which, when suitable voltages are applied, generates a potential distribution in the chamber similar to that which would be present between two concentric spherical electrodes, if the X-ray source were situated at the common center thereof during an exposure. To achieve this, each of the two chamber walls is provided with annular electrodes 2 which are concentric relative to each other, the center 3 of the upper electrode structure coinciding (in the plan view) of the figure exactly with the center of the lower electrode structure. During the exposure, the X-ray source is situated on a central axis determined by the connecting line between the two centers. The desired potential distribution is obtained when potentials in accordance with the following equation $$U(x,y,z) = E_0 \frac{y_0 - y_0^2}{\sqrt{x^2 + y^2 + z^2}} - U_0$$

are applied to the individual electrodes, $y_0$ being the distance between the center 3 and the source, $x$ being the distance from the center 3 in the longitudinal direction, $z$ being the distance from the center in the direction of the shorter side, $E_0$ being the electrical field strength at the point where $y = y_0$ and $x = z = 0$, and $U_0$ being a a constant which can be chosen at random. As appears from the equation, a change in the distance between the X-ray source and the chamber can be taken into account by a corresponding variation in the potentials applied to the electrodes.

The chamber 1 accommodates an insulating foil 4 whose dimension in the longitudinal direction of the chamber, is substantially smaller than that of the chamber. As denoted by a double arrow 5, the foil 4 is slidable in the longitudinal direction of the chamber. When radiation enters perpendicularly, the insulating foil is slid to the left so that the center of the insulating foil coincides with the center 3. To achieve this, the distance between the center 3 and the left-hand shorter side of the chamber must equal approximately half the dimension of the insulating foil in the longitudinal direction. When the radiation enters obliquely, the foil must be displaced to the right, the extent of the displacement being dependent on the angle of incidence of the central beam of the irradiated field.

In the case of a chamber from which the insulating foil is removed after each exposure and a new insulating foil is inserted, the insulating foil can be correctly positioned, for example, by means of a scale provided on the chamber. This scale should mark the position of the center or of an edge of the film foil in dependence on the angle of incidence of the radiation. Corresponding means must be provided for maintaining the insulating foil in this postion relative to the chamber. In principle it is alternatively possible to secure the insulating foil in a kind of carriage and to displace this carriage by means of a follower control system which is controlled by the angle of incidence of the radiation.

When exposures are made from different directions, the chamber 1 must be arranged to be rotatable about the center 3 in the exposure device.

When the distance between the X-ray source, or better still the focal point, and the chamber is 100 cm and the maximum size of the insulating foil is 40 $\times$ 40 cm, while the maximum oblique projection is 25°, the chamber must have a length of 86 cm and a width of 40 cm. The center 3 is arranged to be at least 20 cm from the left-hand shorter side on the longitudinal center line of the chamber. The field strength at the right-hand shorter side of the chamber is approximately 70% of the field strength along the axis forming the connecting line between the centers 3. The potentials should preferably be chosen so that a non-self-sustaining plateau region of the Townsend discharge curve prevails between the chamber walls. Therein, substantially all ions and electrons generated by the X-radiation arrive at the electrodes, without generating additional carriers in the gas. This can avoid a situation in which the same radiation intensity gives rise to a different charge carrier density at the edge of the insulating foil than that present in the vicinity of the center 3.

What is claimed is:

1. An X-ray exposure device comprising a flat and plane rectangular chamber filled with an ionizable gas, electrode structures disposed on the walls of the chamber which generate a potential distribution corresponding to that of two concentric spherical electrodes having a given central axis during operation, and an insulating foil on which charge carriers resulting from ionization of the gas by X-radiation are incident and displaceable in the longitudinal direction within the chamber for producing a latent charge image thereon.

2. An X-ray exposure device as claimed in claim 1, wherein the central axis of the concentric potential distribution is situated on a center line in the longitudinal direction of the chamber, nearer to one of the shorter sides than to the other.

3. An X-ray exposure device as claimed in claim 2, wherein the electrode structures are annular, and the distance between the central axis of the electrode system and a shorter side of the chamber is at least half the dimension of the insulating foil in said longitudinal direction.

4. An X-ray exposure device as claimed in claim 1 wherein the chamber is rotatable about the central axis of the electrode system.

* * * * *